(12) United States Patent
Lee et al.

(10) Patent No.: US 12,280,699 B2
(45) Date of Patent: Apr. 22, 2025

(54) CONVENIENCE APPARATUS FOR REAR SEAT PASSENGER AND OPERATION CONTROL METHOD THEREOF

(71) Applicants: Hyundai Motor Company, Seoul (KR); Kia Corporation, Seoul (KR); Hyundai Transys Inc., Seosan-si (KR)

(72) Inventors: Tae Hoon Lee, Suwon-Si (KR); Byeong Seon Son, Seoul (KR); Se Jin Park, Namyangju-Si (KR); Ji Hwan Kim, Seoul (KR); Sang Ho Kim, Incheon (KR); Sang Hoon Park, Incheon (KR); Gu Chang Kang, Seoul (KR); Seong Yun Yeo, Seongnam-Si (KR); Sung Hoon Kim, Seoul (KR)

(73) Assignees: Hyundai Motor Company, Seoul (KR); Kia Corporation, Seoul (KR); Hyundai Transys Inc., Seosan-si (KR)

( * ) Notice: Subject to any disclaimer, the term of this patent is extended or adjusted under 35 U.S.C. 154(b) by 290 days.

(21) Appl. No.: 18/075,222

(22) Filed: Dec. 5, 2022

(65) Prior Publication Data
US 2024/0017655 A1    Jan. 18, 2024

(30) Foreign Application Priority Data
Jul. 12, 2022   (KR) .................. 10-2022-0085743

(51) Int. Cl.
| | |
|---|---|
| *B60N 2/90* | (2018.01) |
| *B60N 2/02* | (2006.01) |
| *B60N 2/56* | (2006.01) |
| *B60N 2/75* | (2018.01) |

(52) U.S. Cl.
CPC .......... *B60N 2/995* (2018.02); *B60N 2/02246* (2023.08); *B60N 2/5621* (2013.01); *B60N 2/5685* (2013.01); *B60N 2/797* (2018.02); *B60N 2/976* (2018.02)

(58) Field of Classification Search
CPC ........ B60N 2/995; B60N 2/797; B60N 2/976; B60N 2/02246; B60N 2/5621; B60N 2/5685
See application file for complete search history.

(56) References Cited

U.S. PATENT DOCUMENTS

| | | | |
|---|---|---|---|
| 7,014,242 | B2 | 3/2006 | Kim |
| 2019/0275919 | A1* | 9/2019 | Gayon |

FOREIGN PATENT DOCUMENTS

| | | | |
|---|---|---|---|
| CN | 203358399 U | * | 12/2013 |
| DE | 112017000794 T5 | * | 12/2018 |
| JP | 5516725 | | 6/2014 |
| JP | 2021-046004 | | 3/2021 |
| KR | 10-1907596 | | 10/2018 |
| WO | WO 2011/135651 | | 11/2011 |

* cited by examiner

*Primary Examiner* — Anthony D Barfield
(74) *Attorney, Agent, or Firm* — Morgan, Lewis & Bockius LLP

(57) ABSTRACT

A seat convenience apparatus for a rear seat passenger and an operation control method thereof is provided in a front seat. When an open angle of a footrest of the front seat does not satisfy a predetermined reference angle under the condition that a rear seat passenger desires to use the seat convenience device, operation of the seat convenience device is disabled in spite of the user's desire. Accordingly, misuse of the seat convenience device is prevented under non-use conditions.

18 Claims, 7 Drawing Sheets

CONVENIENCE APPARATUS FOR REAR SEAT PASSENGER AND OPERATION CONTROL METHOD THEREOF

CROSS-REFERENCE TO RELATED APPLICATION

The present application claims priority to Korean Patent Application No. 10-2022-0085743, filed on Jul. 12, 2022, the entire contents of which is incorporated herein for all purposes by this reference.

BACKGROUND OF THE PRESENT DISCLOSURE

Field of the Present Disclosure

The present disclosure relates to a convenience apparatus for a rear seat passenger and an operation control method thereof, and more particularly to a rear seat passenger convenience apparatus allowing a rear seat passenger to determine use of a heating function, a ventilation function or a foot massage function provided in a front seat in accordance with an open angle of a footrest provided at the front seat, and an operation control method of the same.

Description of Related Art

In a vehicle, a seat, on which a passenger may be accommodated, is provided. The seat of the vehicle includes a seat cushion configured to support a lower body of the passenger, a seatback configured to support an upper body of the passenger, and a headrest configured to support a head of the passenger.

For an enhancement in rear seat passenger convenience, a footrest may be provided at a backboard coupled to a seatback of a front seat (including a driver's seat and a passenger seat) so that the footrest is pivotable rearwards to protrude rearwards thereof.

Furthermore, a seat convenience device for a rear seat passenger may be provided in the seatback of the front seat. In the instant case, the seat convenience device may include a heating function through a heating wire, a ventilation function through a blower and a foot massage function through a foot massage machine.

Upon using the seat convenience device provided in the front seat, the rear seat passenger first opens the footrest, and then lays the feet on the footrest, and accordingly, may use the seat convenience device.

However, conventional seat convenience devices are configured to operate or to stop operation in accordance with a desire of the user, irrespective of an open angle of a footrest. For the present reason, when malfunction occurs in a closed state of the footrest, there may be a high danger of fire due to overheating in the case of a heating function, and there may be problems of generation of severe noise and degradation in durability in the case of a foot massage function. Furthermore, there may be a drawback in that electric power is unnecessarily consumed due to activation of functions under non-use conditions (in a closed state of the footrest).

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a convenience apparatus for a rear seat passenger and an operation control method thereof, in which, when an open angle of a footrest of a front seat does not satisfy a predetermined reference angle under the condition that the rear seat passenger desires to use the seat convenience device (including heating, ventilation and foot massage functions) provided in the front seat, operation of the seat convenience device is disabled in spite of the user's desire, and accordingly, is prevented under non-use conditions, not only achieving prevention of fire and damage to parts caused by misuse of the seat convenience device and an enhancement in durability, but also achieving a reduction in unnecessary electric power consumption.

In accordance with an aspect of the present disclosure, the above and other objects may be accomplished by the provision of a convenience apparatus for a rear seat passenger including a touchscreen configured to be manipulated by a passenger, for operation of a footrest and a seat convenience device provided at a seat, a seat controller configured to receive a signal from the touchscreen, generating a control signal, a footrest driving mechanism configured to receive the control signal from the seat controller, performing an operation to operate the footrest, a convenience device controller configured to receive a signal from the seat controller, generating a control signal, and a convenience device driving mechanism configured to receive the control signal of the convenience device controller, performing an operation to operate the seat convenience device, wherein the seat convenience device includes a heater, a ventilator or a foot massage machine provided at a seatback of a front seat.

The footrest may be provided at a backboard of the front seat, and is configured to be opened through rearward pivoting thereof.

The seat convenience device may be operable when an open angle of the footrest is equal to or greater than a reference angle under control of the seat controller.

The touchscreen may be an armrest touchscreen provided at an armrest of a rear seat.

The footrest driving mechanism may include a footrest motor including a Hall sensor provided therein, and a footrest gear mechanism configured to transmit driving force of the footrest motor to the footrest.

The convenience device driving mechanism may include a heating wire for the heater, a blower for the ventilator and a pneumatic pump for the foot massage machine provided at the seatback of the front seat.

In accordance with another aspect of the present disclosure, there is provided an operation control method of a convenience apparatus for a rear seat passenger including opening a footrest by a footrest open signal generated in accordance with manipulation of a touchscreen, primarily determining whether or not an open angle of the footrest is not smaller than a reference angle, activating a manipulation switch of a seat convenience device on a screen of the touchscreen when the primarily determining determines the open angle of the footrest not to be smaller than the reference angle, and operating the seat convenience device in accordance with manipulation of the activated manipulation switch.

The footrest may be provided at a backboard of a front seat, and a footrest motor may be driven under control of a seat controller when the footrest open signal generated in accordance with manipulation of the touchscreen is transmitted to the seat controller, pivoting the footrest rearwards to be opened.

When the footrest motor is driven, a Hall sensor provided in the footrest motor may detect an open angle of the footrest and may transmit the detected open angle to the seat controller. The seat controller may be configured to determine whether or not the open angle of the footrest received from the Hall sensor is not smaller than the reference angle.

The reference angle may be a minimum open angle of the footrest in a state in which the rear seat passenger can lay his or her feet on the opened footrest.

The seat convenience device may be provided at a seatback of a front seat, and may include a heater, a ventilator or a foot massage machine configured to provide convenience to the rear seat passenger in a state in which the rear seat passenger lays his or her feet on the opened footrest.

The operation control method may further include inactivating the manipulation switch of the seat convenience device on the screen of the touchscreen when the primarily determining determines the open angle of the footrest to be smaller than the reference angle. By the inactivating, a passenger cannot manipulate the manipulation switch, causing operation of the seat convenience device to be disabled.

After the inactivating, the seat controller may be configured to determine whether or not failure of a footrest operating system including a footrest driving mechanism has occurred. A control logic may be ended upon determining that failure has occurred, and may be fed back to precede the primarily determining upon determining that no failure has occurred.

The seat convenience device may operate even when a signal of a seatback reminder (SBR) sensor, rather than a manipulation signal for the manipulation switch, is transmitted to the seat controller upon the operating.

A heating wire or a ventilator of a rear seat, or at least one of the heating wire or the ventilator may operate together with the seat convenience device when a passenger's request is generated during operation of the seat convenience device upon the operating.

The heating wire or the ventilator of the rear seat may operate alone irrespective of the seat convenience device when a passenger's request is generated in a state in which operation of the seat convenience device is disabled due to the inactivating.

The operation control method may further include secondarily determining whether or not an operation end signal has been generated after the operating, transmitting a control signal to a convenience device controller by a seat controller when the secondarily determining determines that the operation end signal has been generated, ending driving of the seat convenience device under control of the convenience device controller, and closing the opened footrest simultaneously with ending of driving of the seat convenience device.

The operation control method may further include thirdly determining whether or not the open angle of the footrest is smaller than the reference angle when the secondarily determining determines that no operation end signal has been generated. The control logic may be fed back to the operating upon determining that the open angle of the footrest is not smaller than the reference angle in accordance with determination results of the thirdly determining, and may be fed back to the ending driving upon determining that the open angle of the footrest is smaller than the reference angle in accordance with determination results of the thirdly determining.

The reference angle may be a minimum open angle of the footrest in a state in which the rear seat passenger can lay his or her feet on the opened footrest.

In accordance with the exemplary embodiment of the present disclosure, the seat convenience device (including the heater, the ventilator and the foot massage machine) is provided in the front seat. When an open angle of the footrest of the front seat does not satisfy a predetermined reference angle under the condition that the rear seat passenger desires to use the seat convenience device, operation of the seat convenience device is disabled in spite of the user's desire, and accordingly, is prevented under non-use conditions. Accordingly, it may be possible to not only achieve prevention of fire and damage to parts caused by misuse of the seat convenience device and an enhancement in durability, but also to achieve a reduction in unnecessary electric power consumption.

Furthermore, in accordance in accordance with the exemplary embodiment of the present disclosure, there is a configuration configured for operating the seat convenience device by use of a signal representing whether or not a rear seat passenger has been accommodated, through the SBR sensor, under the condition that use of the seat convenience device is enabled. Accordingly, the configuration for realizing driving conditions of the seat convenience device may be simplified, and accordingly, there are advantages in that a reduction in cost may be achieved, and an enhancement in use convenience may be achieved.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
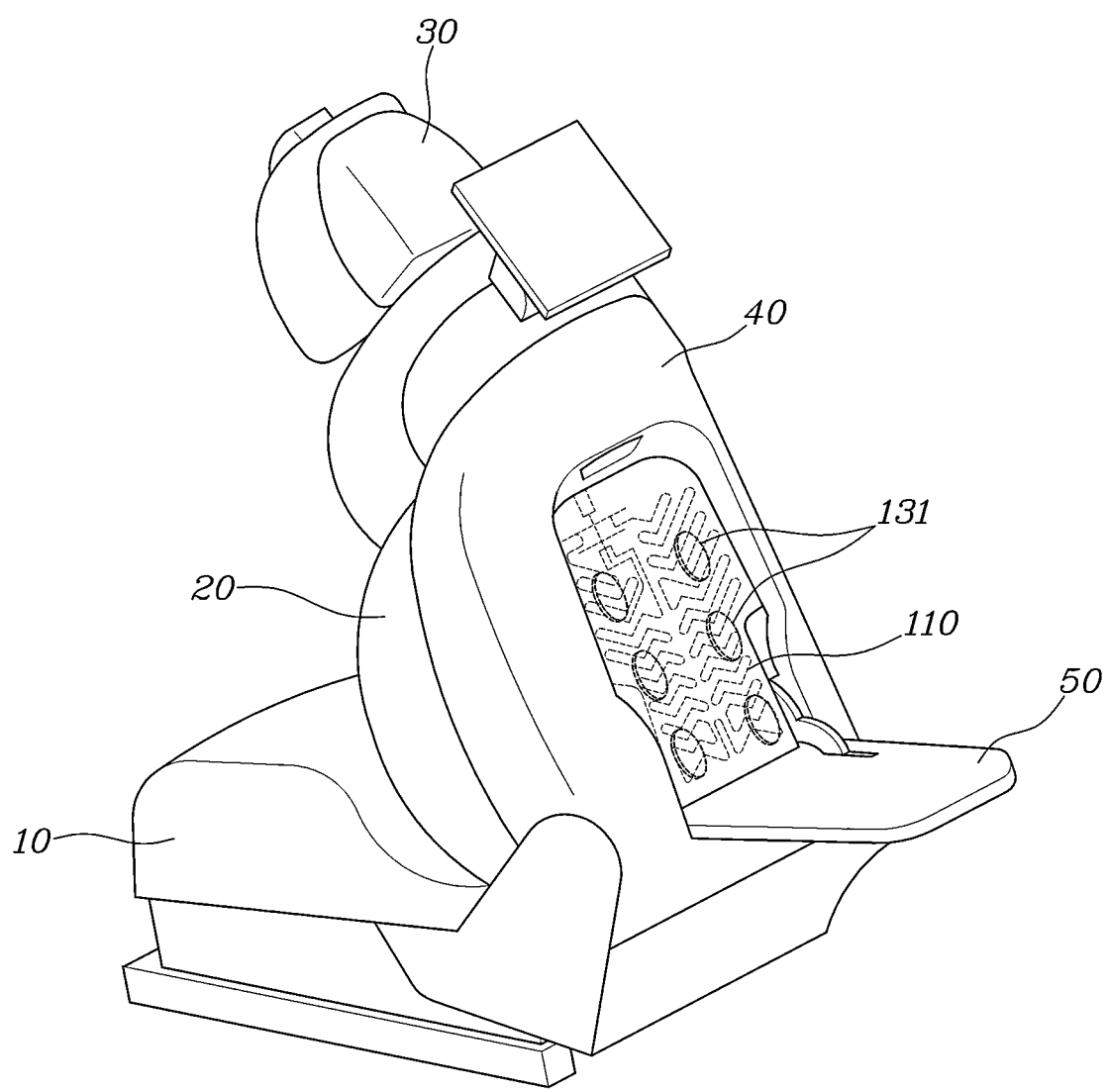
FIG. 1 is a view of a front seat to which a rear seat passenger convenience apparatus according to various exemplary embodiments of the present disclosure is applied.
Figure 2:
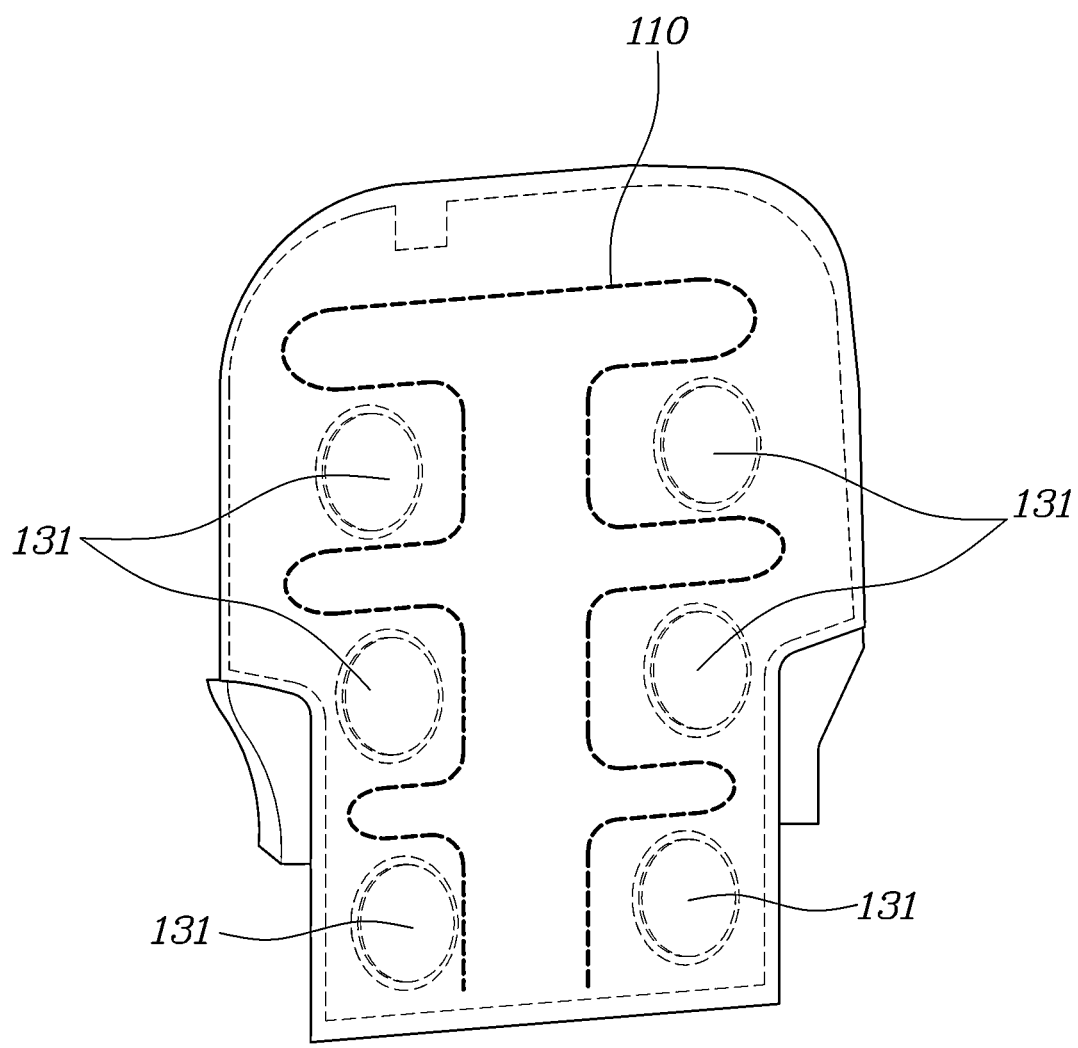
FIG. 2 and FIG. 3 are views explaining a seat convenience device provided in a front seat.
Figure 3:
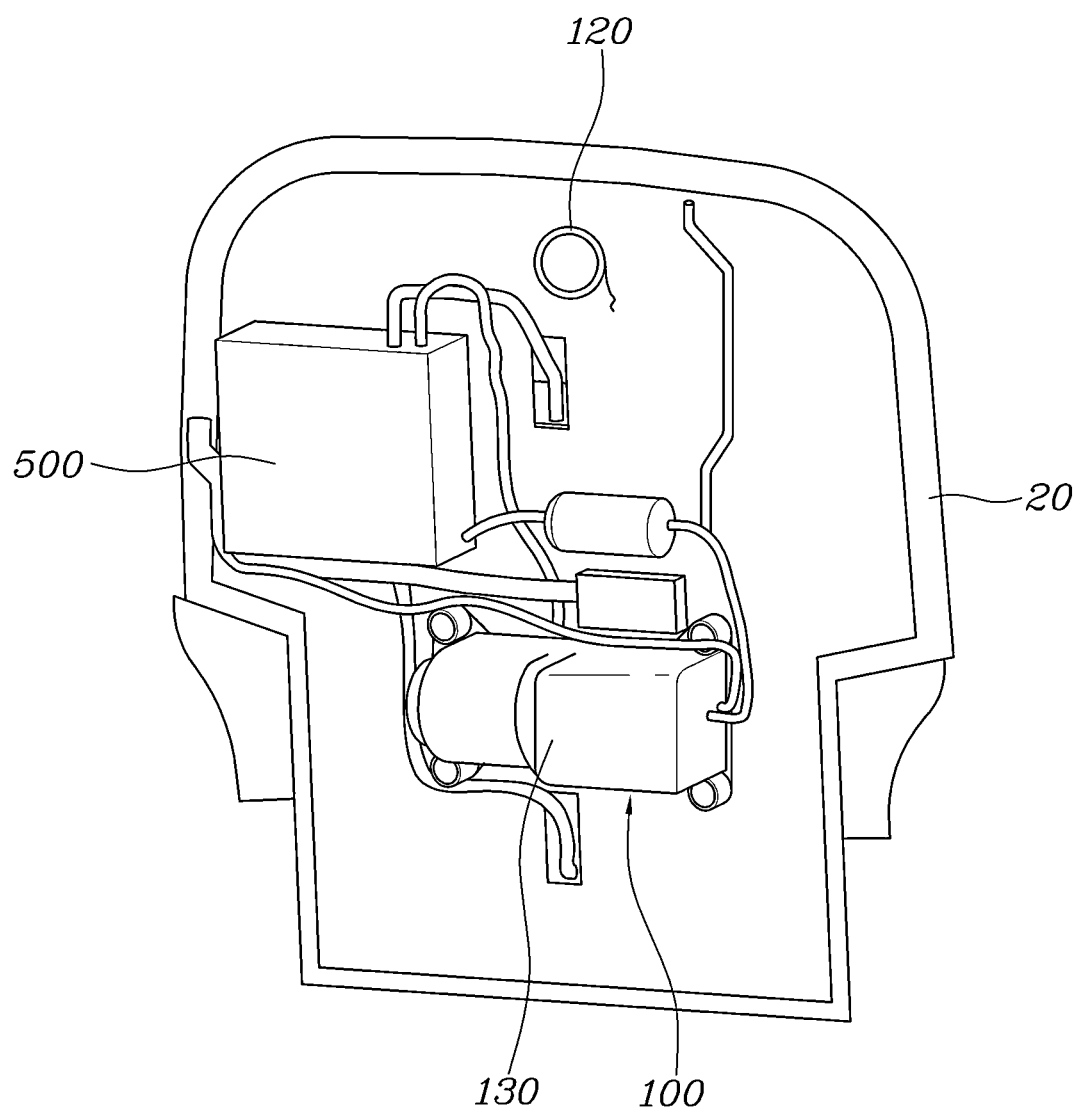

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments of the present disclosure will be described in detail with reference to the accompanying drawings, and the same or similar elements are designated by the same reference numerals regardless of the numerals in the drawings and redundant description thereof will be omitted.

The suffixes "module" and "unit" of elements herein are used for convenience of description and thus may be used interchangeably and do not have any distinguishable meanings or functions.

In the following description of the exemplary embodiments of the present disclosure, a detailed description of known functions and configurations incorporated herein will be omitted when it may obscure the subject matter of the exemplary embodiments of the present disclosure.

Furthermore, the exemplary embodiments of the present disclosure will be more clearly understood from the accompanying drawings and may not be limited by the accompanying drawings, and it is to be appreciated that all changes, equivalents, and substitutes that do not depart from the spirit and technical scope of the present disclosure are encompassed in an exemplary embodiment of the present disclosure It will be understood that, although the terms "first," "second," etc. may be used herein to describe various elements, these elements may not be limited by these terms. These terms are only used to distinguish one element from another.

In the case where an element is "connected" or "linked" to another element, it should be understood that the element may be directly connected or linked to the other element, or another element may be present therebetween.

Conversely, in the case where an element is "directly connected" or "directly linked" to another element, it should be understood that no other element is present therebetween.

Unless clearly used otherwise, singular expressions include a plural meaning.

In the present specification, the term "comprising," "including," or the like, is directed to express the existence of the characteristic, the numeral, the step, the operation, the element, the part, or the combination thereof, and does not exclude another characteristic, numeral, step, operation, element, part, or any combination thereof, or any addition thereto.

Furthermore, the term "unit" or "control unit" used in specific terminology such as a motor control unit (MCU), a hybrid control unit (HCU), or the like is only a term widely used for designation of a controller for controlling a function of a vehicle, and accordingly, does not mean a generic functional unit.

The controller may include a communication device configured to communicate with another controller or a sensor, for control of a function to be performed Accordingly, a memory configured to store an operating system, logic commands, input/output information, etc., and at least one processor configured to execute discrimination, calculation, determination, etc. required for control of the function to be performed.

Hereinafter, a rear seat passenger convenience apparatus and an operation control method thereof according to exemplary embodiments of the present disclosure will be described with reference to the accompanying drawings.

As shown in FIGS. 1 to 7, a seat of a vehicle includes a seat cushion 10 configured to support a lower body of a passenger, a seatback 20 configured to support an upper body of the passenger, and a headrest 30 configured to support a head of the passenger.

For an enhancement in convenience of a passenger accommodated on a rear seat 2, a footrest 50 may be provided at a backboard 40 coupled to a seatback 20 of a front seat 1 so that the footrest 50 is pivotable rearwards to protrude rearwards thereof.

The footrest 50 is formed to have a panel shape having a certain thickness, and is pivotably coupled, at a lower end portion thereof, to the footrest 50 by a hinge pin.

When the footrest 50 is brought into close contact with the backboard 40 as the upper end portion of the footrest 50 pivots upwards and forwards, the footrest 50 enters a closed state. On the other hand, when the footrest 50 protrudes rearwards as the upper end portion of the footrest 50 pivots downwards, the footrest 50 enters an open (opened) state.

Figure 4:
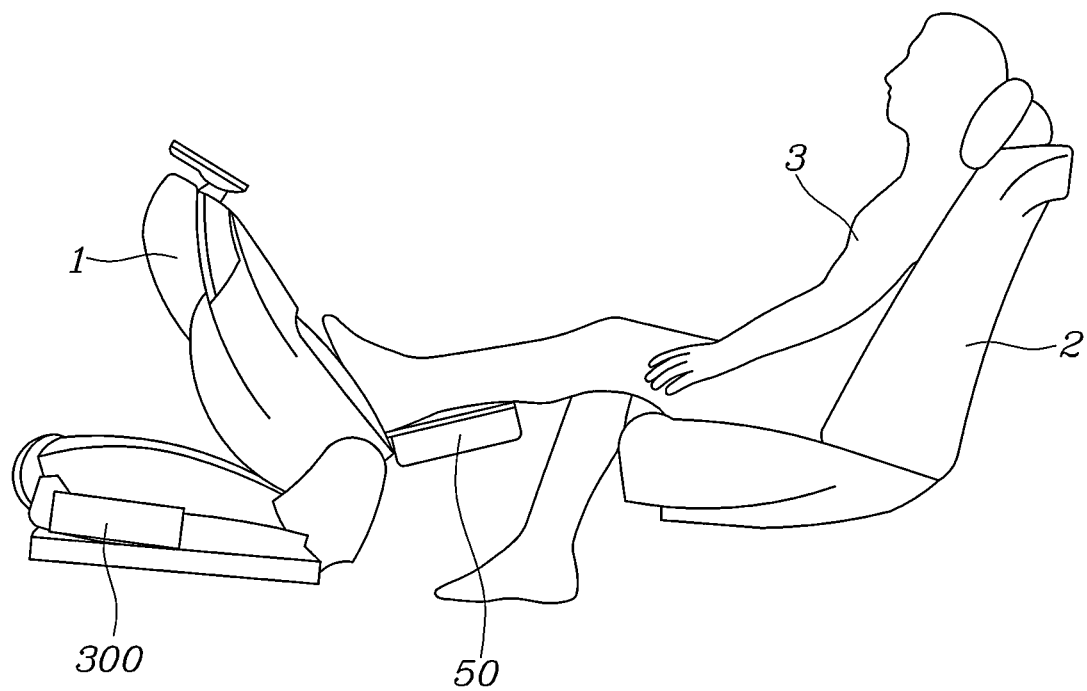
FIG. 4 is a view showing a state in which a rear seat passenger utilizes the seat convenience device.
Figure 5:
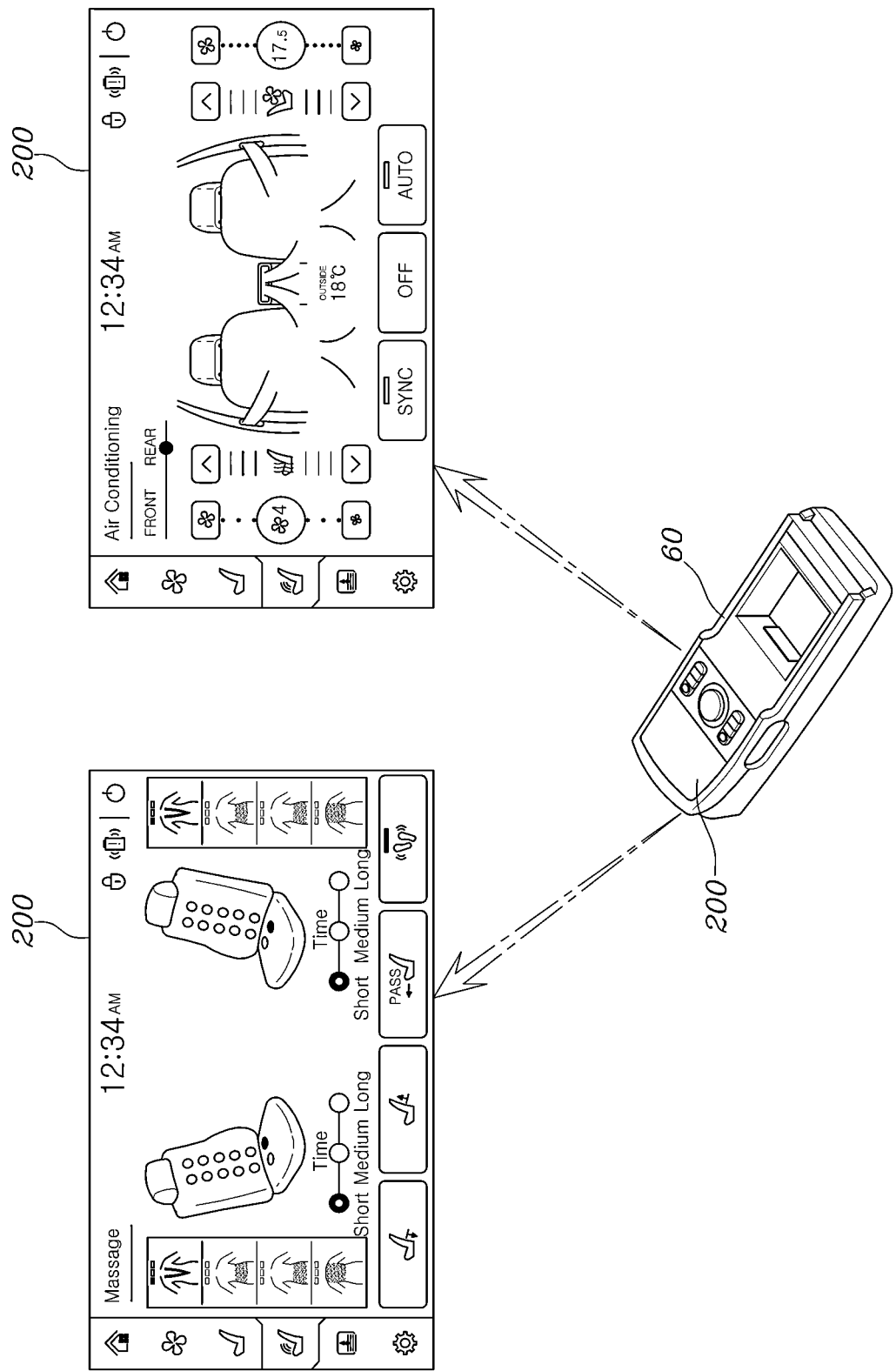
FIG. 5 is a schematic view explaining a state in which a screen of a touchscreen is provided at an armrest of a rear seat.

In an opened state of the footrest 50 as shown in FIG. 4, a passenger 3 of the rear seat 2 is allowed to lay his or her feet on the opened footrest 50, and accordingly, may comfortably rest in the instant state using a seat convenience device 100 provided in the front seat 1.

That is, the seat convenience device 100 for the rear seat passenger 3 may be provided in the seatback 20 of the front seat 1. The seat convenience device 100 may include a heater 110 using a heating wire 610, a ventilator 120 using a blower 620, and a foot massage machine 130 using an pneumatic pump 630.

Accordingly, the rear seat passenger 3 opens the footrest 50 of the front seat 1, lays his or her feet on the opened footrest 50, and may then use a desired function of the seat convenience device 100 selected from the heater 110, the ventilator 120 and the foot massage machine 130 by driving the seat convenience device 100. Air pockets 131 is provided on the backboard 40 or the seat convenience device 100 to increase thermal insulation.

Meanwhile, the exemplary embodiment of the present disclosure is characterized in that, when an open angle of the footrest 50 of the front seat 1 does not satisfy a predetermined reference angle under the condition that the rear seat passenger 3 desires to use the seat convenience device 100 provided in the front seat 1, operation of the seat convenience device 100 is disabled in spite of the user's desire, and accordingly, is prevented under non-use conditions.

To accomplish the above-described feature, the rear seat passenger convenience apparatus according to the exemplary embodiment of the present disclosure includes a touchscreen 200 configured to be manipulated by the passenger 3, for operation of the footrest 50 and the seat convenience device 100 provided in the seat 1, a seat controller 300 configured to receive a signal from the touchscreen 200, generating a control signal, a footrest driving mechanism 400 configured to receive a signal from the seat controller 300, performing an operation to operate the footrest 50, a convenience device controller 500 configured to receive a signal from the seat controller 300, generating a control signal, and a convenience device driving mechanism 600 configured to receive a signal from the convenience device controller 500, performing an operation to operate the seat convenience device 100.

In accordance with the exemplary embodiment of the present disclosure, the seat convenience device 100 can operate only in a state in which an open angle of the footrest 50 is not smaller than a reference angle, under control of the seat controller 300. The reference angle is a minimum open angle of the footrest 50 in a state in which the rear seat passenger 3 can lay his or her feet on the opened footrest 50. For example, a state in which the footrest 50 pivots 50° rearwards with reference to a state in which the footrest 50 is closed as the footrest 50 is brought into close contact with the backboard may be set to the reference angle, without being limited thereto.

The touchscreen 200 may be an armrest touchscreen (ATS) provided at an armrest 60 of the rear seat 2.

The seat controller 300 is provided at a seat provided with the seat convenience device 100, that is, the front seat 1, and may be a power seat module (PSM) controller.

The footrest driving mechanism 400 may include a footrest motor 410 provided at the front seat 1 while including a Hall sensor provided therein, and a footrest gear mechanism 420 configured to transmit driving force of the footrest motor 410 to the footrest 50.

An open angle of the footrest 50 may be detected through the Hall sensor provided in the footrest motor 410, and the detected open angle of the footrest 50 may be transmitted to the seat controller 300.

The seat controller 300 determines whether or not a manipulation switch of the seat convenience device 100 should be activated on a screen of the touchscreen 200, based on the received open angle of the footrest 50. Furthermore, the seat controller 300 transmits the received open angle signal of the footrest 50 to the convenience device controller 500. Accordingly, the convenience device controller 500 determines whether or not the convenience device driving mechanism 600 should be driven, using the received open angle signal of the footrest 50, and accordingly, is configured to control driving of the convenience device driving mechanism 600.

The footrest gear mechanism 420 is a power transmission medium for transmitting driving force of the footrest motor 410 to the footrest 50. In the instant case, the footrest gear mechanism 420 may include a plurality of gears, a plurality of rotation shafts, etc.

The convenience device driving mechanism 600 includes a heating wire 610 for driving of the heater 110, a blower 620 for the ventilator 120, and a pneumatic pump 630 for the foot massage machine 130. The convenience device controller 500 may be an integrated controller configured for controlling driving of the heating wire 610, the blower 620 and the pneumatic pump 630 in an individual manner.

Figure 6:
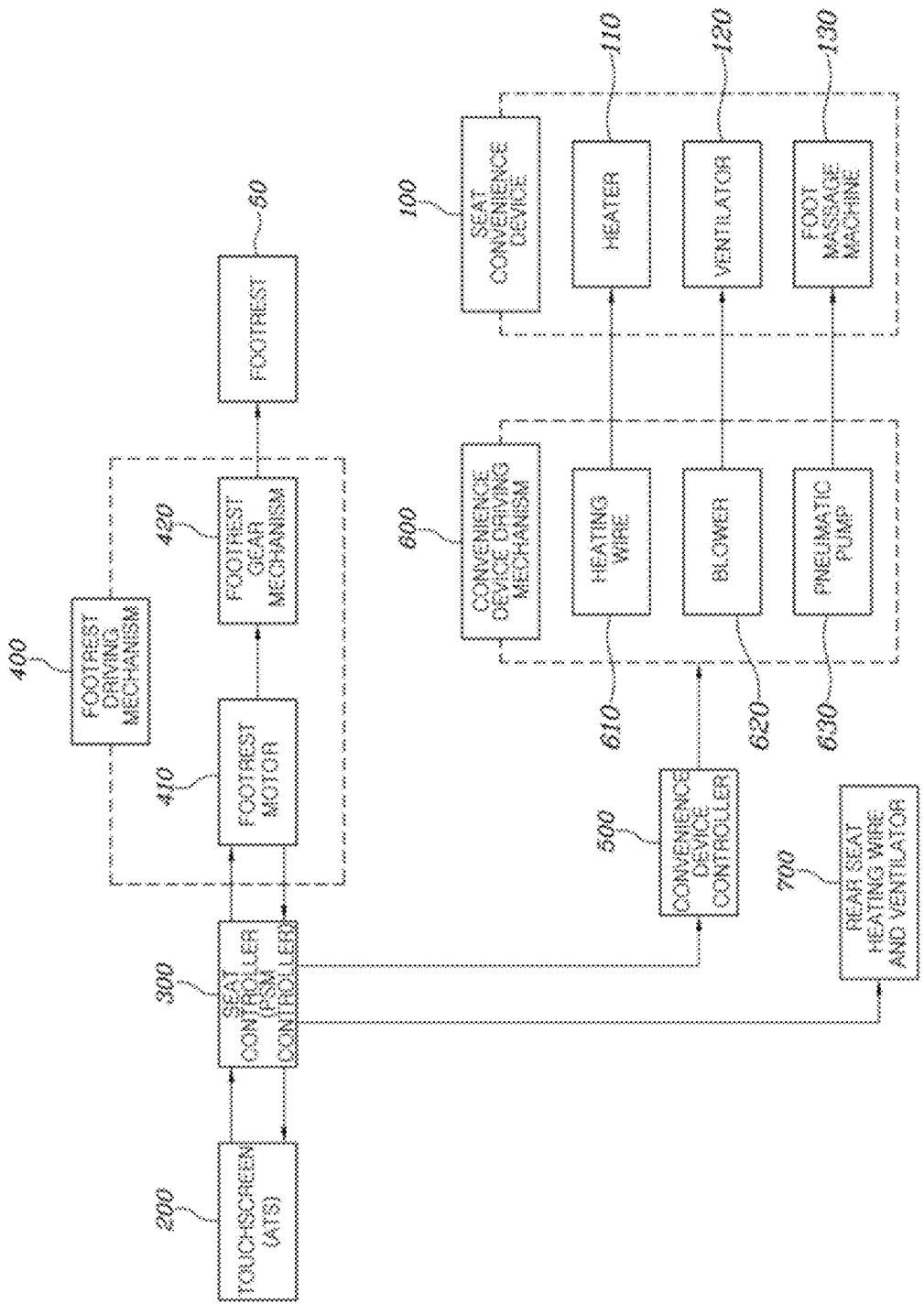
FIG. 6 and FIG. 7 are a block diagram and a flowchart explaining an operation control method of the rear seat passenger convenience apparatus according to various exemplary embodiments of the present disclosure, respectively.
Figure 7:
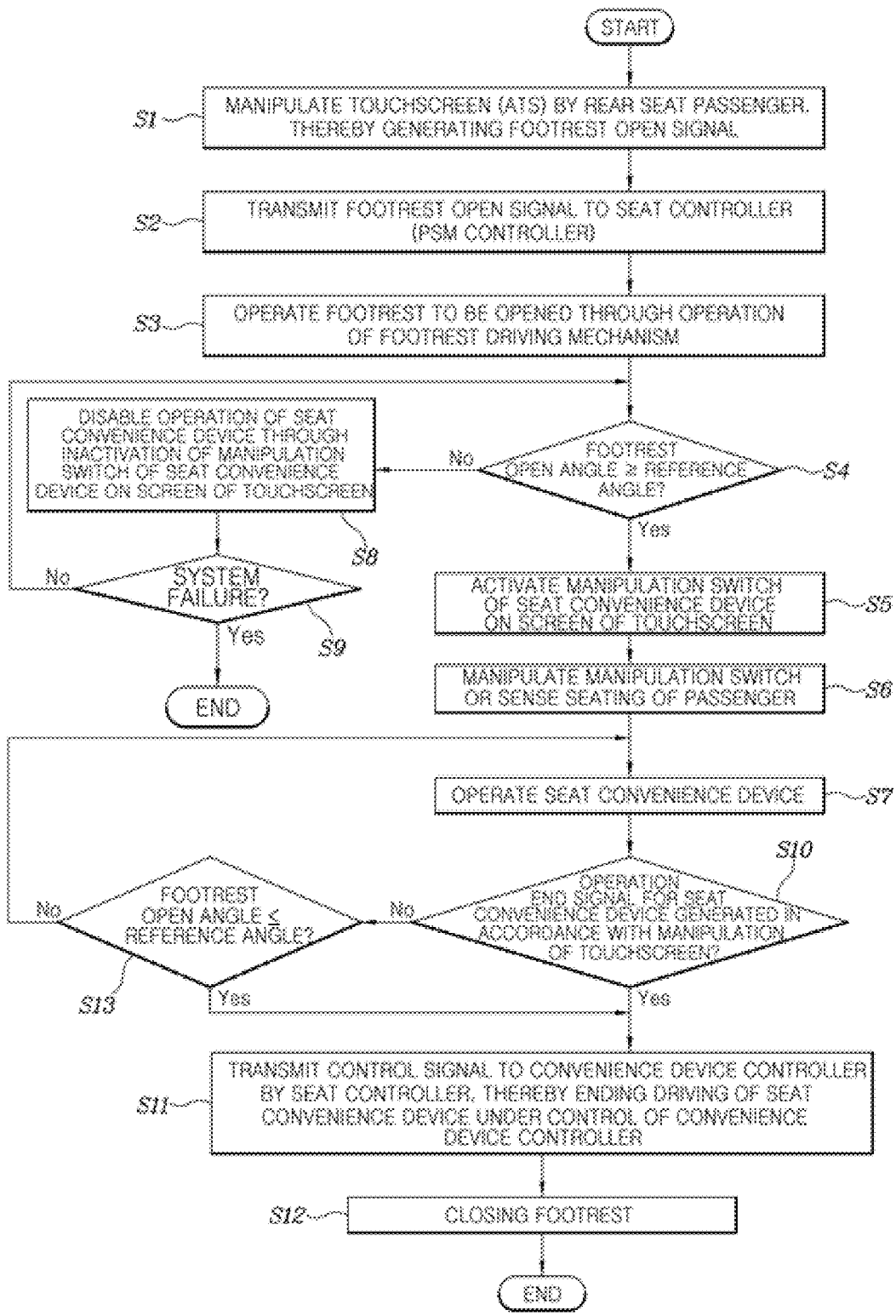

Hereinafter, the operation method of controlling the rear seat passenger convenience apparatus according to the exemplary embodiment of the present disclosure will be described with reference to FIG. 6 and FIG. 7.

The operation method of controlling the rear seat passenger convenience apparatus according to the exemplary embodiment of the present disclosure includes an opening step of opening the footrest 50 by a footrest open signal generated in accordance with manipulation of the touchscreen 200, a primary determination step of determining whether or not an open angle of the footrest 50 is not smaller than a reference angle, an activation step of activating a manipulation switch of the seat convenience device 100 on the screen of the touchscreen 200, and an operating step of operating the seat convenience device 100 in accordance with manipulation of the activated manipulation switch.

When the rear seat passenger 3 manipulates the touchscreen 200 of the armrest a footrest open signal is generated (step S1), and the generated footrest open signal is transmitted to the seat controller 300 (step S2). The seat controller 300 then sends a control signal to the footrest driving mechanism 400, driving the footrest driving mechanism 400, and, accordingly, the footrest 50 performs an opening operation in accordance with driving of the footrest driving mechanism 400 (step S3: opening step).

When the footrest motor 410 operates under control of the seat controller 300, the Hall sensor provided in the footrest motor 410 detects an open angle of the footrest and the detected open angle of the footrest 50 is transmitted to the seat controller 300. The seat controller 300 then determines whether the open angle of the footrest 50 received from the Hall sensor is not smaller than the reference angle (step S4: primary determination step).

The reference angle is a minimum open angle of the footrest 50 in a state in which the rear seat passenger 3 can lay his or her feet on the opened footrest 50. For example, a state in which the footrest 50 pivots 50° rearwards with reference to a state in which the footrest 50 is closed as the footrest 50 is brought into close contact with the backboard 40 may be set to the reference angle, without being limited thereto.

When the footrest 50 is opened at an open angle not smaller than the reference angle, a passenger 3 of the rear seat 2 may rest in a state of laying his or her feet on the opened footrest 50.

Furthermore, upon determining that the open angle of the footrest 50 is not smaller than the reference angle, in accordance with determination results of the primary determination step (step S4), the seat controller 300 transmits a control signal to the touchscreen 200 and the convenience device controller 500.

When the touchscreen 200 receives the signal from the seat controller 300, manipulation switches including various shapes, which will be manipulated for operation of the seat convenience device 100, are activated on the screen of the touchscreen 200 (step S5: activation step).

When the convenience device controller 500 receives the signal from the seat controller 300, the convenience device controller 500 enters a state of completing preparation for generating a control signal for operation of the convenience device driving mechanism 600.

When one manipulation switch is activated on the screen of the touchscreen 200, the user manipulates the activated manipulation switch, operating a desired unit of the seat convenience device 100 (step S6).

The seat convenience device 100 is provided in the front seat 1, and includes the heater 110, the ventilator 120 and the foot massage machine 130, which may provide convenience to the rear seat passenger 3 in a state in which the rear seat passenger 3 lays his or her feet on the opened footrest 50. The user may operate the heater 110, the ventilator 120 or the foot massage machine 130 of the seat convenience device 100 by manipulating the manipulation switch activated on the touchscreen 200, and accordingly, may get desired convenience (step S7: operating step).

Meanwhile, although the user may operate the seat convenience device 100 by manipulating the manipulation switch activated on the touchscreen 200, the convenience device driving mechanism 600 may also be driven under control of the seat controller 300 and the convenience device controller 500 when the footrest 50 performs an opening operation in accordance with manipulation of the touchscreen 200 by the user so that the footrest 50 is opened at an open angle not smaller than the reference angle, and a signal from a seatback reminder (SBR) sensor of the rear seat 2 is transmitted to the seat controller 300, and, accordingly, the seat convenience device 100 may be driven by the convenience device driving mechanism 600 (steps S6 and S7).

The SBR sensor is used as a reference for determining whether or not a passenger has been accommodated on the rear seat 2.

When the seat convenience device 100 operates in the operating step S7, the user may additionally manipulate a switch, etc. to operate a rear seat heating wire and ventilator 700. In the instant case, a rear seat heating wire, a rear seat ventilator or at least one of the rear seat heating wire or the rear seat ventilator may operate together with the seat convenience device 100, and accordingly, all passengers accommodated on the rear seat 2 may get convenience.

Meanwhile, when the open angle of the footrest 50 is determined to be smaller than the reference angle, in accordance with determination results of the primary determination step S4, the manipulation switch for the seat convenience device 100 is inactivated on the screen of the touchscreen 200 under control of the seat controller 300 (inactivation step). When the screen of the touchscreen 200 is inactivated, the passenger cannot manipulate the manipulation switch, and accordingly, operation of the seat convenience device 100 is disabled (step S8).

After the inactivation step S8, the seat controller 300 determines whether or not failure of a footrest operating system including the footrest driving mechanism 400 has occurred (step S9). Upon determining that failure has occurred in accordance with determination results of step S9, the control logic of the present disclosure is ended. On the other hand, upon determining that there is no failure, the control logic is fed back to the step preceding the primary determination step (step S4), and then continuously proceeds in accordance with a provided sequence.

When the user additionally manipulates a switch, etc., for operation of the rear seat heating wire and ventilator 700 under the condition that operation of the seat convenience device 100 is disabled due to the inactivation step (step S8), the rear seat heating wire or the rear seat ventilator operates alone irrespective of the seat convenience device 100, and accordingly, some of the passengers accommodated on the rear seat 2 may get convenience through operation of the rear seat heating wire and ventilator 700.

Meanwhile, the control logic according to an exemplary embodiment of the present disclosure includes a secondary determination step (step S10) of determining whether or not an operation end signal for the seat convenience device 100 has been generated after the operating step (step S7).

Upon determining that the end signal has been generated in accordance with determination results of the secondary determination step (step S10), the seat controller 300 sends a control signal to the convenience device controller 500, and operation of the convenience device driving mechanism 600 is then ended under control of the convenience device controller 500, and accordingly, driving of the seat convenience device 100 is ended (step S11: driving ending step).

Furthermore, when driving of the seat convenience device 100 is ended through the driving ending step (step S11), the opened footrest 50 pivots forwards simultaneously with the driving ending so that the footrest 50 is brought into close contact with the seatback 20, and, accordingly, the footrest 50 is closed (step S12: closing step).

On the other hand, upon determining that no end signal has been generated in accordance with determination results of the secondary determination step (step S10), a third determination step (step S12) of determining whether or not the open angle of the footrest 50 is smaller than the reference angle is further executed. Upon determining that the open angle of the footrest 50 is not smaller than the reference angle in accordance with determination results of the third determination step (step S12), the control logic is fed back to the operating step (step S7). On the other hand, upon determining that the open angle of the footrest 50 is smaller than the reference angle, the control logic is fed back to the driving ending step (step S11), and then proceeds in accordance with a provided sequence.

As described above, in accordance with the exemplary embodiment of the present disclosure, the seat convenience device 100 (including the heater, the ventilator and the foot massage machine) is provided in the front seat 1. When an open angle of the footrest 50 of the front seat 1 does not satisfy a predetermined reference angle under the condition that the rear seat passenger 3 desires to use the seat convenience device 100, operation of the seat convenience device 100 is disabled in spite of the user's desire, and accordingly, is prevented under non-use conditions. Accordingly, it may be possible to not only achieve prevention of fire and damage to parts caused by misuse of the seat convenience device 100 and an enhancement in durability, but also to achieve a reduction in unnecessary electric power consumption.

Furthermore, in accordance in accordance with the exemplary embodiment of the present disclosure, there is a configuration configured for operating the seat convenience device 100 by use of a signal representing whether or not a rear seat passenger 3 has been accommodated, through the SBR sensor, under the condition that use of the seat convenience device 100 is enabled. Accordingly, the configuration for realizing driving conditions of the seat convenience device 100 may be simplified, and accordingly, there are advantages in that a reduction in cost may be achieved, and an enhancement in use convenience may be achieved.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A convenience apparatus for a rear seat passenger, the convenience apparatus comprising:
a touchscreen configured to be manipulated by a passenger, for operation of a footrest and a seat convenience device provided at a seat;
a seat controller configured to receive a signal from the touchscreen, generating a control signal;
a footrest driving mechanism configured to receive the control signal from the seat controller, performing an operation to operate the footrest;
a convenience device controller configured to receive the control signal from the seat controller, generating a control signal; and
a convenience device driving mechanism configured to receive the control signal of the convenience device controller, performing an operation to operate the seat convenience device,
wherein the seat convenience device includes a heater, a ventilator or a foot massage machine provided at a seatback of a front seat, and
wherein the footrest driving mechanism includes:
a footrest motor including a Hall sensor provided therein; and
a footrest gear mechanism configured to transmit driving force of the footrest motor to the footrest.

2. The convenience apparatus of claim 1, wherein the footrest is provided at a backboard of the front seat, and is configured to be opened through rearward pivoting thereof.

3. The convenience apparatus of claim 1, wherein the seat convenience device is operable when an open angle of the footrest is equal to or greater than a reference angle under control of the seat controller.

4. The convenience apparatus of claim 1, wherein the touchscreen is an armrest touchscreen provided at an armrest of a rear seat.

5. The convenience apparatus of claim 1, wherein the convenience device driving mechanism includes a heating wire for the heater, a blower for the ventilator and a pneumatic pump for the foot massage machine provided at the seatback of the front seat.

6. An operation control method of a convenience apparatus for a rear seat passenger, the operation control method comprising:
opening, by a seat controller, a footrest by a footrest open signal generated in accordance with manipulation of a touchscreen;
primarily determining, by the seat controller, whether an open angle of the footrest is equal to or greater than a reference angle;
activating, by the seat controller, a manipulation switch of a seat convenience device on a screen of the touchscreen when in the primarily determining, the open angle of the footrest is equal to or greater than the reference angle; and
operating the seat convenience device in accordance with manipulation of the activated manipulation switch,
wherein the seat convenience device operates even when a signal of a seatback reminder (SBR) sensor, rather than a manipulation signal for the manipulation switch, is transmitted to the seat controller upon the operating.

7. The operation control method of claim 6, wherein the footrest is provided at a backboard of a front seat, and a footrest motor is driven under control of the seat controller when the footrest open signal generated in accordance with manipulation of the touchscreen is transmitted to the seat controller, pivoting the footrest rearwards to be opened.

8. The operation control method of claim 7, wherein
when the footrest motor is driven, a Hall sensor provided in the footrest motor detects the open angle of the footrest and transmits the detected open angle to the seat controller; and
the seat controller is configured to determine whether the open angle of the footrest received from the Hall sensor is equal to or greater than the reference angle.

9. The operation control method of claim 6, wherein the reference angle is a minimum open angle of the footrest in a state in which the rear seat passenger can lay his or her feet on the opened footrest.

10. The operation control method of claim 6, wherein the seat convenience device is provided at a seatback of a front seat, and includes a heater, a ventilator or a foot massage machine configured to provide convenience to the rear seat passenger in a state in which the rear seat passenger lays his or her feet on the opened footrest.

11. The operation control method of claim 6, further including:
inactivating, by the seat controller, the manipulation switch of the seat convenience device on the screen of the touchscreen when in the primarily determining the open angle of the footrest is smaller than the reference angle,
wherein, by the inactivating, a passenger cannot manipulate the manipulation switch, causing operation of the seat convenience device to be disabled.

12. The operation control method of claim 11, wherein
after the inactivating, the seat controller is configured to determine whether failure of a footrest operating system including a footrest driving mechanism has occurred; and
a control logic is ended upon determining that failure has occurred, and is fed back to precede the primarily determining upon determining that no failure has occurred.

13. The operation control method of claim 11, wherein a heating wire or a ventilator of a rear seat operates alone irrespective of the seat convenience device when a passenger's request is generated in a state in which operation of the seat convenience device is disabled due to the inactivating.

14. The operation control method of claim 6, wherein a heating wire or a ventilator of a rear seat, or at least one of the heating wire or the ventilator operates together with the seat convenience device when a passenger's request is generated during operation of the seat convenience device upon the operating.

15. The operation control method of claim 6, further including:
secondarily determining, by the seat controller, whether an operation end signal has been generated after the operating;
transmitting, by the seat controller, a control signal to a convenience device controller when in the secondarily determining, the operation end signal has been generated, ending driving of the seat convenience device under control of the convenience device controller; and
closing the opened footrest simultaneously with ending of driving of the seat convenience device.

16. The operation control method of claim 15, further including:
thirdly determining, by the seat controller, whether the open angle of the footrest is smaller than the reference angle when in the secondarily determining, no operation end signal has been generated,
wherein a control logic is fed back to the operating upon determining that the open angle of the footrest is equal to or greater than the reference angle in accordance with determination results of the thirdly determining, and is fed back to the ending driving upon determining that the open angle of the footrest is smaller than the reference angle in accordance with the determination results of the thirdly determining.

17. The operation control method of claim 16, wherein the reference angle is a minimum open angle of the footrest in a state in which the rear seat passenger can lay his or her feet on the opened footrest.

18. An operation control method of a convenience apparatus for a rear seat passenger, the operation control method comprising:
opening, by a seat controller, a footrest by a footrest open signal generated in accordance with manipulation of a touchscreen;
primarily determining, by the seat controller, whether an open angle of the footrest is equal to or greater than a reference angle;
activating, by the seat controller, a manipulation switch of a seat convenience device on a screen of the touchscreen when in the primarily determining, the open angle of the footrest is equal to or greater than the reference angle; and
operating the seat convenience device in accordance with manipulation of the activated manipulation switch,
wherein the footrest is provided at a backboard of a front seat, and a footrest motor is driven under control of the seat controller when the footrest open signal generated in accordance with manipulation of the touchscreen is transmitted to the seat controller, pivoting the footrest rearwards to be opened, and
wherein:
when the footrest motor is driven, a Hall sensor provided in the footrest motor detects the open angle of the footrest and transmits the detected open angle to the seat controller; and
the seat controller is configured to determine whether the open angle of the footrest received from the Hall sensor is equal to or greater than the reference angle.

* * * * *